United States Patent
Ito

(10) Patent No.: US 10,958,736 B2
(45) Date of Patent: Mar. 23, 2021

(54) INFORMATION PROCESSING APPARATUS, METHOD OF CONTROLLING THE INFORMATION PROCESSING APPARATUS, AND STORAGE MEDIUM

(71) Applicant: CANON KABUSHIKI KAISHA, Tokyo (JP)

(72) Inventor: Yuki Ito, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 27 days.

(21) Appl. No.: 16/382,465

(22) Filed: Apr. 12, 2019

(65) Prior Publication Data

US 2019/0327308 A1 Oct. 24, 2019

(30) Foreign Application Priority Data

Apr. 19, 2018 (JP) .............................. JP2018-080819

(51) Int. Cl.
*H04L 29/08* (2006.01)
*H04L 29/12* (2006.01)

(52) U.S. Cl.
CPC ........ *H04L 67/141* (2013.01); *H04L 61/2015* (2013.01)

(58) Field of Classification Search
None
See application file for complete search history.

(56) References Cited

U.S. PATENT DOCUMENTS

| 2011/0080609 A1* | 4/2011 | Park | H04L 12/5692 |
| | | | 358/1.15 |
| 2014/0268221 A1* | 9/2014 | Sako | H04N 1/00204 |
| | | | 358/1.15 |
| 2016/0278140 A1* | 9/2016 | Sung | H04B 7/18589 |

FOREIGN PATENT DOCUMENTS

JP 4032814 B2 1/2008

OTHER PUBLICATIONS

User's Guide, published by Samsung for MFP M207x series, copyrighted 2013 (Year: 2013).*

* cited by examiner

*Primary Examiner* — Yaotang Wang
(74) *Attorney, Agent, or Firm* — Rossi, Kimms & McDowell LLP

(57) ABSTRACT

An information processing apparatus comprises a plurality of network interface that are connectable to respective networks differing from each other; at least one memory that stores a set of instructions; and at least one processor that executes the instructions, the instructions, when executed, causing the information processing apparatus to perform operations comprising: setting, based on a user input, a network interface used for a given function, and a communication parameter of each network interface for a case that the each network interface is used for the given function; and executing the given function by using the set network interface by the setting.

9 Claims, 9 Drawing Sheets

FIG. 8

MAIN LINE SETTING — 801

- 802 — IP ADDRESS □□□.□□□.□□□.□□□
- 803 — SUBNET MASK □□□.□□□.□□□.□□□
- 804 — DEFAULT GATEWAY □□□.□□□.□□□.□□□
- 805 — DHCP  ON ☐  OFF ☑

SUB LINE SETTING — 901

- 902 — IP ADDRESS □□□.□□□.□□□.□□□
- 903 — SUBNET MASK ADDRESS □□□.□□□.□□□.□□□
- 904 — DHCP  ON ☐  OFF ☑

DNS SERVER SETTING

1002 — PREFERRED DNS SERVER  □□□.□□□.□□□.□□□
1003 — ALTERNATIVE DNS SERVER  □□□.□□□.□□□.□□□

DEVICE INFORMATION TRANSMISSION SETTING

1102 SELECT INTERFACE                                   MAIN LINE ☐   SUB LINE ☑
1103 TRANSMISSION DESTINATION OF
     DEVICE INFORMATION OF MAIN LINE                    □□□□□□□□□□
     DEFAULT GATEWAY OF SUB LINE                        □□□.□□□.□□□.□□□
1104 TRANSMISSION DESTINATION OF
     DEVICE INFORMATION OF SUB LINE                     □□□.□□□.□□□.□□□
1105

1106 OK

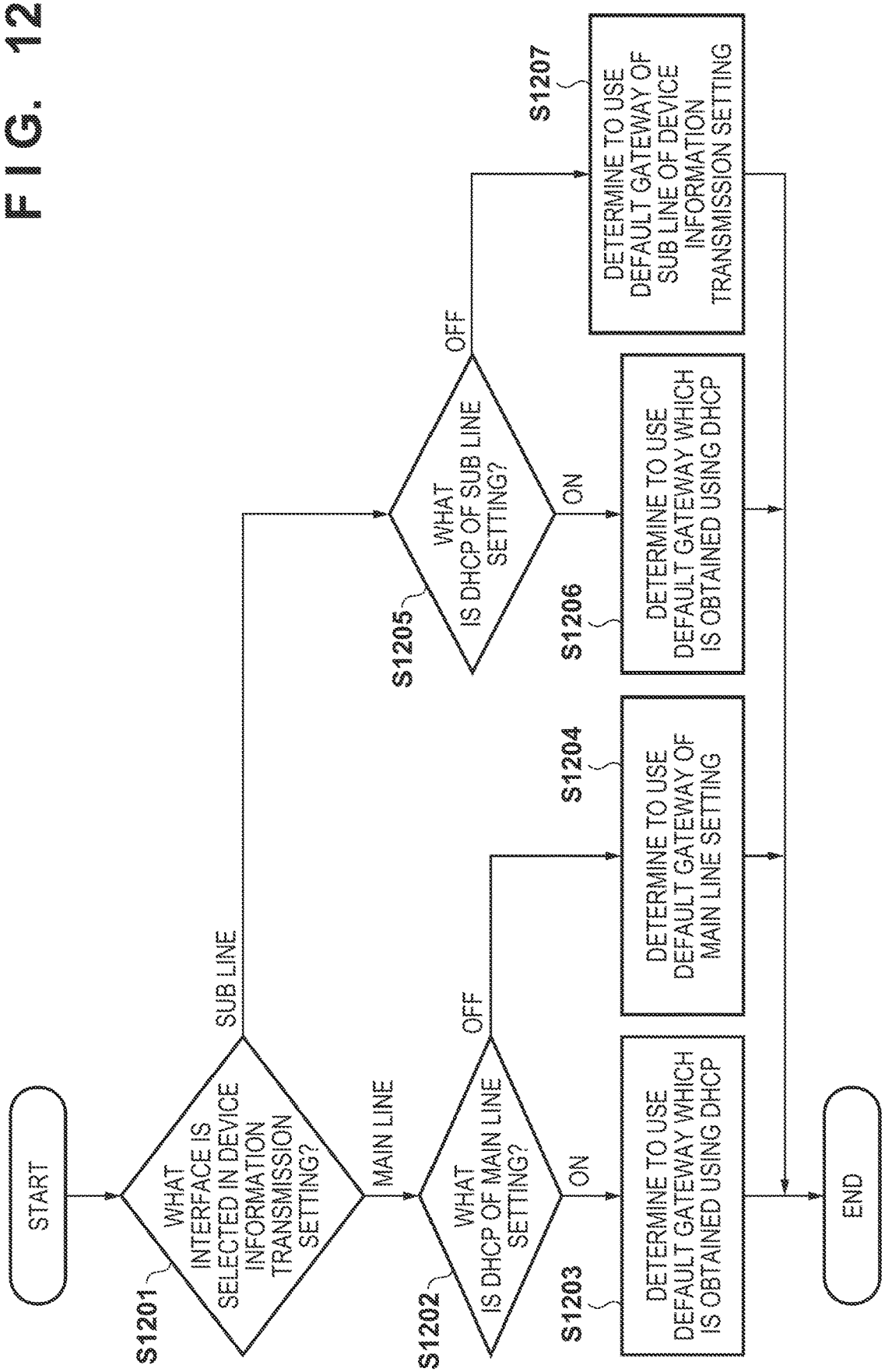

INFORMATION PROCESSING APPARATUS, METHOD OF CONTROLLING THE INFORMATION PROCESSING APPARATUS, AND STORAGE MEDIUM

BACKGROUND OF THE INVENTION

Field of the Invention

The present invention relates to an information processing apparatus that includes a plurality of network interfaces and can be connected to a plurality of networks simultaneously. The present invention also relates to a method of controlling the information processing apparatus, and a storage medium.

Description of the Related Art

In recent years, the security and functionality required for networks are increasingly becoming complicated, and accordingly configurations in which a plurality of local area networks (LANs) are separately used in offices and commercial facilities have been widely used. Therefore, the information processing apparatus to be used is required to provide the service to a plurality of LANs. Japanese Patent No. 4032814 discloses a configuration in which one information processing apparatus is provided with a plurality of network interfaces. As network configurations, there are redundant configurations in which the same information device is connected to the same network by using a plurality of network interfaces, and configurations in which an information device is shared by connecting to different networks by using respective network interfaces. For such information devices, a transmitting function of transmitting device information to a particular information device by using any of the plurality of interfaces is known.

Meanwhile, a typical name resolution method for the transmission destination achieves a name resolution for only one connection LAN. For example, a name resolution is achieved in such a manner that a terminal sends a name resolution request packet to a name resolution server (DNS server) connected to via one LAN, and the DNS server outputs a reply to the terminal as a name resolution response packet after the name resolution. Note that DNS is an abbreviation of Domain Name Service. Typically, a communication terminal having a client function of DNS name resolution can use a plurality of DNS servers as preparation for a failure of the DNS server or the like. For example, in the case that no name resolution response packet is sent from the preferred DNS server, a name resolution request is made to an alternative DNS server. However, a configuration that uses a preferred DNS server and an alternative DNS server is for redundancy, and therefore in the case that a response indicating that an IP address cannot be obtained from the preferred DNS server is returned, such a result is employed. That is, in the case that an IP address cannot be obtained from the name resolution response from the preferred DNS server, the DNS client terminal determines that the name resolution has failed and does not make a name resolution request to the alternative DNS server.

However, the above-mentioned conventional technology has the following problems. For example, in the case that an information device is simultaneously connected to a plurality of independent networks so as to perform a name resolution in each network, the name resolution method of the above-mentioned conventional technology cannot appropriately perform the name resolution in some situations. To be more specific, when an IP address cannot be obtained from the name resolution result of the response of the preferred DNS server to a certain name resolution request, the information device operates as though a name resolution failure has occurred and does not make a name resolution request to an alternative DNS server. In this case, it is not possible to execute the name resolution of a communication terminal connected with a network in which the DNS server set as the preferred DNS server is not disposed. For the above-mentioned reason and the like, a given function cannot be used in some situations. Under such circumstances, there is a demand for a configuration for appropriately setting a communication parameter in communication lines adaptable to communication errors and the like, while controlling interfaces such that available interfaces can be selected from among a plurality of interfaces.

SUMMARY OF THE INVENTION

The present invention enables realization of a configuration for appropriately setting a communication parameter of an interface used for a given function in an apparatus that can connect a plurality of interfaces to different networks. The present invention also enables realization of a configuration for achieving communications with a particular transmission destination even when a name resolution cannot be achieved in a given network.

One aspect of the present invention provides an information processing apparatus comprising: a plurality of network interface that are connectable to respective networks differing from each other; at least one memory that stores a set of instructions; and at least one processor that executes the instructions, the instructions, when executed, causing the information processing apparatus to perform operations comprising: setting, based on a user input, a network interface used for a given function, and a communication parameter of each network interface for a case that the each network interface is used for the given function; and executing the given function by using the set network interface by the setting.

Another aspect of the present invention provides a method of controlling an information processing apparatus, the information processing apparatus comprising a plurality of network interface that are connectable to respective networks differing from each other, the method comprising: setting, based on a user input, a network interface used for a given function, and a communication parameter of each network interface for a case that the each network interface is used for the given function; and executing the given function by using the set network interface by the setting.

Still another aspect of the present invention provides a non-transitory computer-readable storage medium storing a computer program for causing a computer to execute a method of controlling an information processing apparatus, the information processing apparatus comprising a plurality of network interface that are connectable to respective networks differing from each other, the method comprising: setting, based on a user input, a network interface used for a given function, and a communication parameter of each network interface for a case that the each network interface is used for the given function; and executing the given function by using the set network interface by the setting.

Further features of the present invention will be apparent from the following description of exemplary embodiments with reference to the attached drawings.

BRIEF DESCRIPTION OF THE DRAWINGS

FIG. 8 illustrates a screen configuration for main line setting according to the embodiment.

FIG. 9 illustrates a screen configuration for sub line setting according to the embodiment.

FIG. 10 illustrates a screen configuration for DNS server setting according to the embodiment.

FIG. 11 illustrates a screen configuration for information transmission setting according to the embodiment.

FIG. 12 is a flowchart of a procedure of a process of determining a default gateway according to the embodiment.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

System Configuration

A first embodiment of the present invention is described below with reference to the accompanying drawings. While an exemplary multifunctional device (MFP) is described in the embodiment, the technique of the present invention is applicable to information processing apparatuses other than multifunctional devices. In addition, while an exemplary case that the technique of the present invention is applied in an office is described in the embodiment, the technique of the present invention is applicable to other systems of any scale on the Internet. In addition, while a function of transmitting device information to a particular information device is described as an example of a given function in the present embodiment, the present embodiment is applicable to a function using a communication line of a plurality of communication lines. In addition, the technique of the present invention is also applicable to a system that transmits a given packet to a given information device connected via a LAN.

Figure 1:
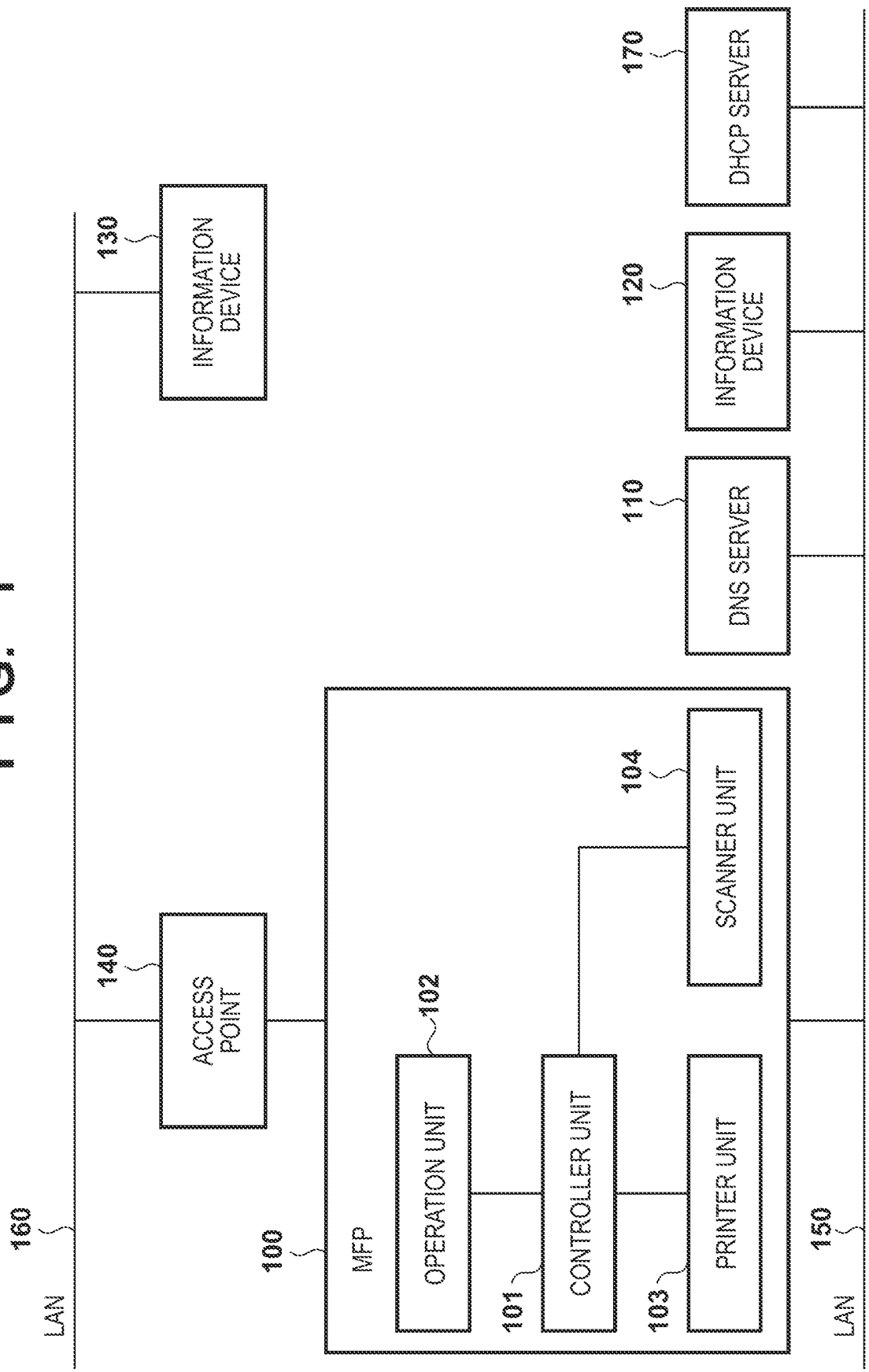
FIG. 1 illustrates a system configuration of a connection configuration of an information device and an MFP according to an embodiment.

First, with reference to FIG. 1, a system configuration representing a connection configuration of an information device and an MFP according to the present embodiment is described. The system includes an MFP 100, a DNS server 110, information devices 120 and 130, an access point 140, and a DHCP server 170. The MFP 100, the DNS server 110, the information device 120, and the DHCP server 170 are connected with one another via a local area network (LAN) 150. The MFP 100 is connected with the access point 140 in a wireless LAN mode, and is connected with a LAN 160 via the access point 140. Also, the information device 130 is connected with the LAN 160.

The MFP 100 is an example of an information processing apparatus. The MFP 100 includes an operation unit 102 for input/output for the user, a printer unit 103 for outputting electronic data onto a paper medium, a scanner unit 104 for reading a paper medium and converting it into electronic data, and a controller unit 101 for controlling the loads of the above-mentioned units. The operation unit 102, the printer unit 103, and the scanner unit 104 are connected with the controller unit 101, and achieve a function of a multifunctional device under the control of the controller unit 101.

Via the LAN 150, the DNS server 110 sends and/or receives a name resolution request packet and a name resolution response packet between the MFP 100 and the information device 120. Via the LAN 150, the DHCP server 170 sends and/or receives a DHCP request packet and a DHCP response packet between the MFP 100 and the information device 120. In addition, by using any of a plurality of communication lines, the MFP 100 of the present embodiment periodically or nonperiodically transmits device information such as counter information and error information to the information device set by the user, and stores logs.

The system is configured with two LANs, the LAN 150 and the LAN 160, and the MFP 100 can be connected to the LANs 150 and 160. The LANs are prioritized. For example, the highest priority is given to the LAN 150, and the lowest priority is given to the LAN 160. While the above-mentioned order of priority is employed in the present embodiment, the present invention may employ other orders of priority. In addition, while an exemplary configuration in which connections to two networks, wired and wireless networks, are established in the present embodiment, the type and number of the networks of the present invention are not limited to this example. For example, any combination other than that of the present embodiment (such as a combination of one wired network and two wired networks, and a combination of one wired network, two wired networks, and a wireless network) may be employed. In addition, while configurations corresponding to two network interfaces are provided as devices, a particular network interface may be disabled depending on the setting. While the LAN 150 is the network interface of highest priority when both the LAN 150 and the LAN 160 are enabled, the LAN 160 is the network interface of highest priority when only the LAN 160 is enabled.

Control Configuration of MFP

Figure 2:
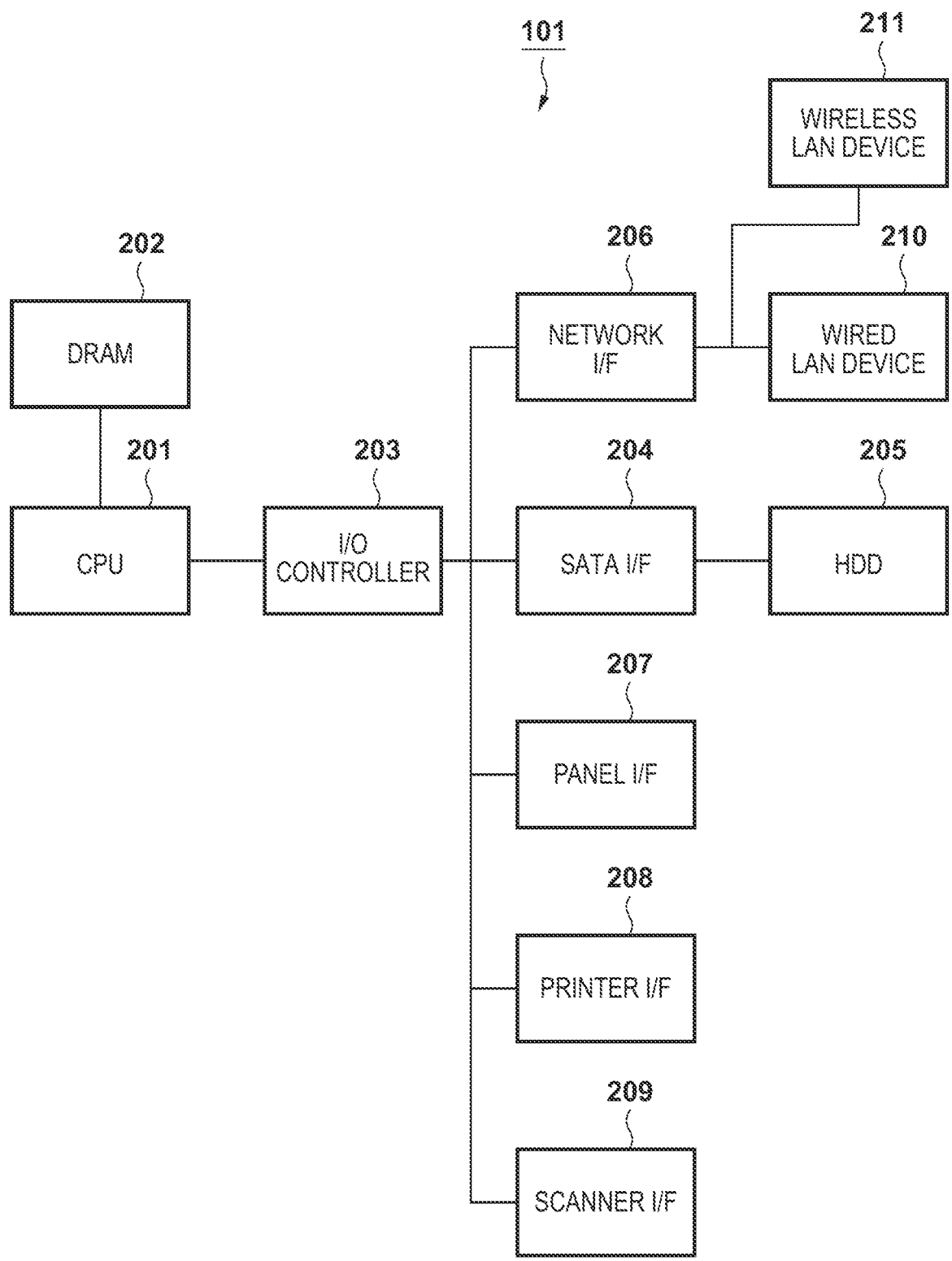
FIG. 2 illustrates an internal configuration of a controller unit of the MFP according to the embodiment.

Next, a detailed exemplary configuration of the controller unit 101 of the MFP according to the present embodiment is described with reference to FIG. 2. The controller unit 101 includes a CPU 201, a DRAM 202, an I/O controller 203, a SATA I/F 204, an HDD 205, and a network I/F 206. Further, the controller unit 101 includes a panel I/F 207, a printer I/F 208, a scanner IX 209, a wired LAN device 210, and a wireless LAN device 211.

The CPU 201 executes main arithmetic processing in the controller unit 101. The CPU 201 is connected with the DRAM 202 through a bus. The DRAM 202 is used by the CPU 201 as an operation memory for temporarily storing data to be processed and program data representing a computation order during a computation of the CPU 201. The CPU 201 is connected with the I/O controller 203 through a bus.

The I/O controller 203 performs input/output for various devices in accordance with an instruction of the CPU 201. The I/O controller 203 is connected with the serial advanced technology attachment (SATA) I/F 204 to which is connected to the HDD 205. The CPU 201 uses the HDD 205 to permanently store read document data, and programs for achieving functions of the MFP 100.

In addition, the I/O controller 203 is connected with the network I/F 206. The wired LAN device 210 and the wireless LAN device 211 are connected to the network I/F 206 as a plurality of communication lines. The CPU 201 controls the wired LAN device 210 via the network I/F 206 to establish communications on the LAN 150. In addition, the CPU 201 controls the wireless LAN device 211 via the network I/F 206 to establish communications on the LAN 160. By using these communication lines, the information transmission according to the present embodiment, which is described as an example of a given function, is performed. Note that, while the information transmission is described as an example in the present embodiment, any function using a communication line may also be employed.

In addition, the I/O controller 203 is connected with the panel I/F 207. The CPU 201 achieves input/output for the user on the operation unit 102 via the panel I/F 207. Further, the I/O controller 203 is connected with the printer IT 208 and the scanner I/F 209. The CPU 201 achieves a process of outputting a paper medium by using the printer unit 103 via the printer I/F 208. The CPU 201 achieves a process of reading documents by using the scanner unit 104 via the scanner I/F 209.

Software Configuration

Figure 3:
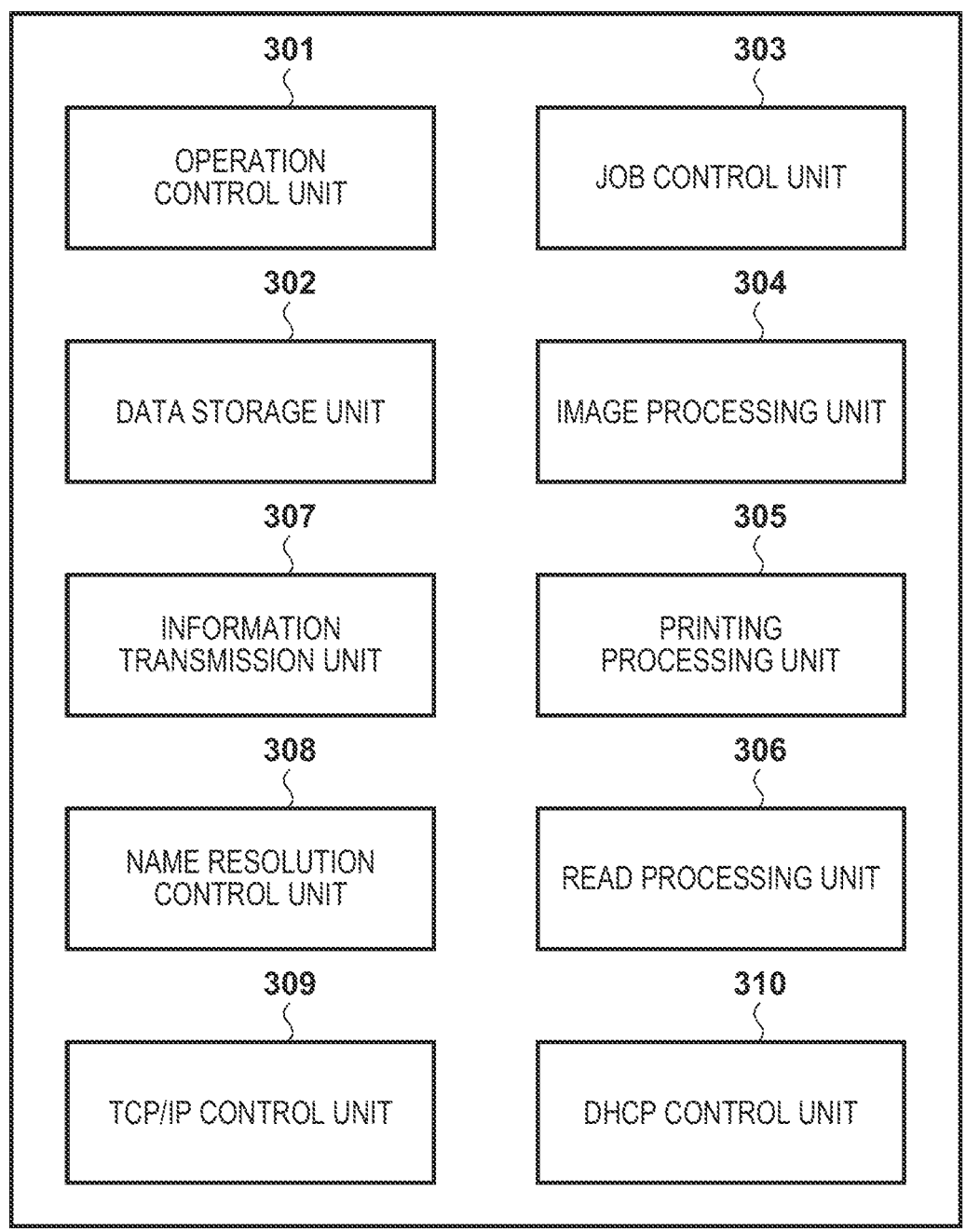
FIG. 3 illustrates a block configuration of software executed in the controller of the MFP according to the embodiment.

Next, a configuration of software that is executed by the controller unit 101 of the MFP 100 is described with reference to FIG. 3. For all the software executed by the controller unit 101, the CPU 201 reads a program stored in the HDD 205 into the DRAM 202, and then executes the program. The controller unit 101 includes an operation control unit 301, a data storage unit 302, a job control unit 303, an image processing unit 304, a printing processing unit 305, a read processing unit 306, an information transmission unit 307, a name resolution control unit 308, a TCP/IP control unit 309, and a DHCP control unit 310.

The operation control unit 301 causes the operation unit 102 to display a screen image for the user, and detects a user operation so as to execute a process associated with a screen part such as a button displayed on the screen. The data storage unit 302 stores data in the HDD 205 and reads stored data from the HDD 205 in response to a request from another control unit. For example, when the user is changing a certain device setting, the operation control unit 301 detects the content input by the user through the operation unit 102, and the data storage unit 302 stores it as a setting value in the HDD 205 in response to a request from the operation control unit 301.

At the time when error occurs and/or at a transmission time for device information set in advance, the information transmission unit 307 executes an information transmission process for the transmission destination of the device information designated in an information transmission setting screen 1101 illustrated in FIG. 11. In the case that the transmission destination of the device information is designated by a fully qualified domain name (FQDN), the information transmission unit 307 acquires a transmission destination IP address by making a request for a name resolution process to the name resolution control unit 308. The information transmission unit 307 makes a request, to the TCP/IP control unit 309, for a process of transmitting the device information to the transmission destination IP address.

The name resolution control unit 308 resolves the IP address of the transmission destination of the device information by executing a name resolution process, and returns the IP address of the transmission destination of the device information to the information transmission unit 307. The TCP/IP control unit 309 executes a process of transmitting/receiving a network packet via the network I/F 206 in accordance with an instruction of another control.

The DHCP control unit 310 executes a DHCP process and acquires an IP address, a subnet mask, and a default gateway from the DHCP server 170, and, sets the IP address, the subnet mask, and the default gateway. The job control unit 303 performs a job execution control in accordance with an instruction of another control unit. The image processing unit 304 transforms image data into a format suitable for the use in accordance with an instruction of the job control unit 303.

The printing processing unit 305 prints an image on a paper medium and outputs it by means of the printer I/F 208 in accordance with an instruction of the job control unit 303. The read processing unit 306 reads a document placed on a platen glass or the like by means of the scanner I/F 209 in accordance with an instruction of the job control unit 303. For example, when a copy function is executed, the operation control unit 301 detects a start request of a copy function, and instructs the job control unit 303 to perform copying. The job control unit 303 acquires a scan image by instructing the read processing unit 306 to read a document. Thereafter, the job control unit 303 instructs the image processing unit 304 to convert the scan image into a format suitable for printing. Further, the job control unit 303 instructs the printing processing unit 305 to perform printing, and outputs a resulting copy.

Exemplary Screen

Figure 4:
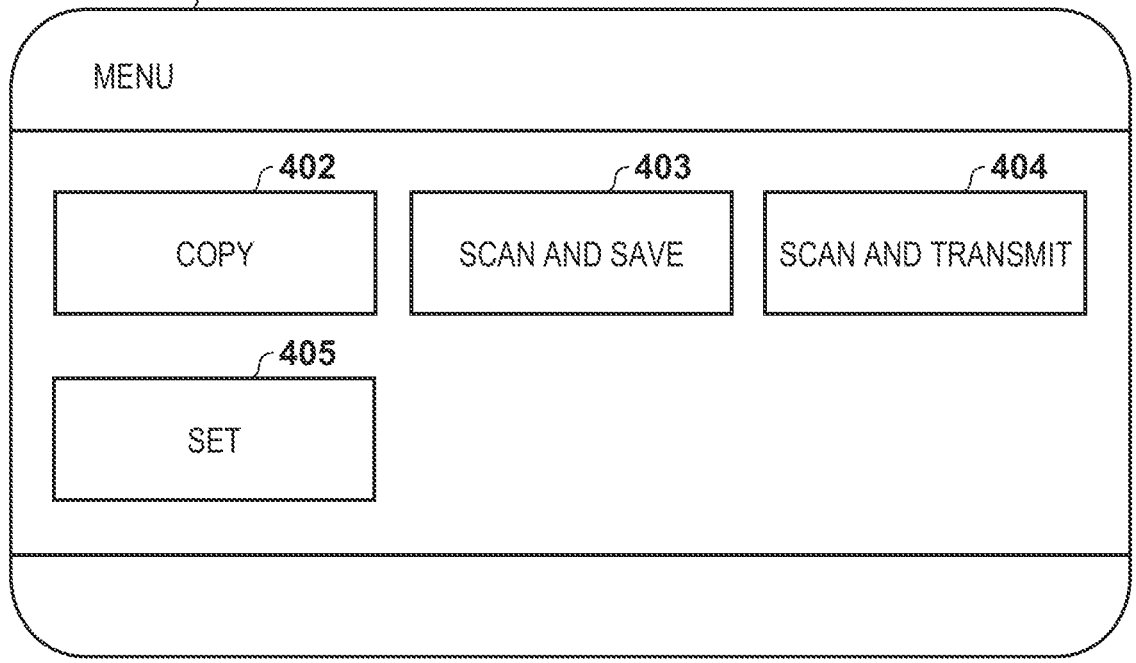
FIG. 4 illustrates a screen configuration for menu setting according to the embodiment.

Now, an exemplary operation screen displayed on the operation unit 102 is described below with reference to FIGS. 4 to 11. FIG. 4 illustrates a menu screen 401 for the user to provide an instruction for execution of various functions provided by the MFP 100.

In the menu screen 401, buttons 402 to 405 are displayed such that the buttons 402 to 405 can be selected. The button 402 is used by the user to provide an instruction for a copy function. The button 403 is used by the user to provide an instruction for a scanning and storing function. The button 404 is used by the user to provide an instruction for a scanning and transmitting function. The button 405 is used by the user to provide an instruction for changing the setting of a device. When the button 405 is pressed, a setting screen 501 illustrated in FIG. 5 can be displayed on the operation unit 102.

Figure 5:
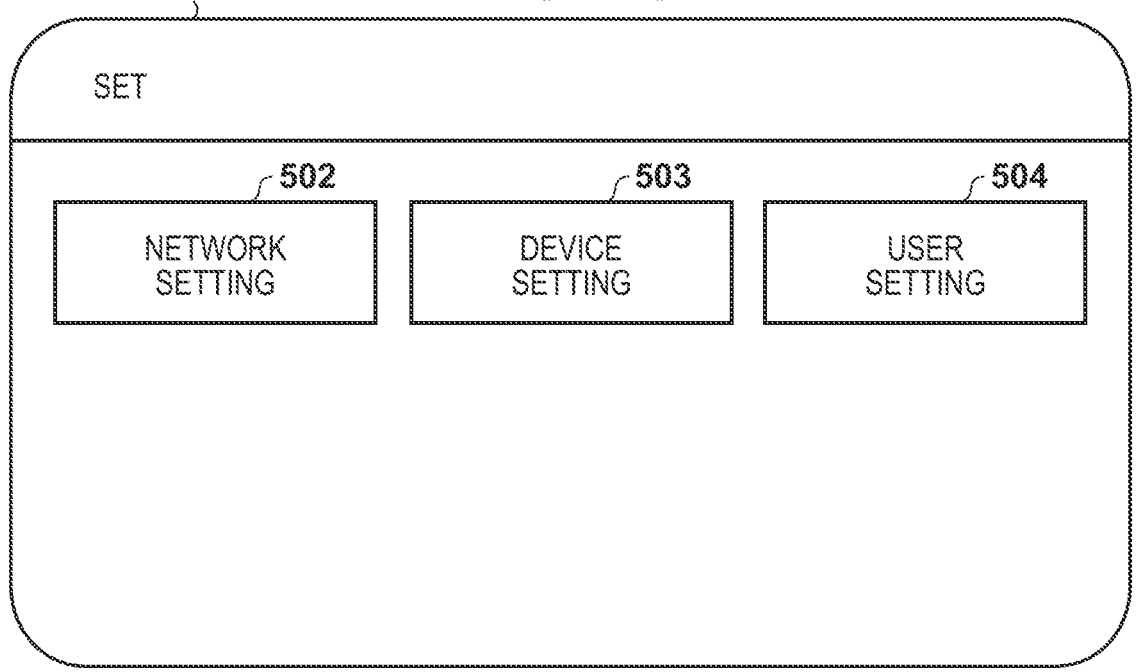
FIG. 5 illustrates a screen configuration of intermediate setting according to the embodiment.

FIG. 5 illustrates the setting screen 501 for the user to provide an instruction for various settings. This screen, which does not include specific setting items, is a middle-layer screen for guiding to specific setting items. In the setting screen 501, buttons 502 to 504 are displayed such that the buttons 502 to 504 can be selected. By pressing the button 502, a network setting screen 601 illustrated in FIG. 6 can be displayed on the operation unit 102. By pressing the button 503, a device setting screen not illustrated in the drawing can be displayed on the operation unit 102. By pressing the button 504, a user setting screen not illustrated in the drawing can be displayed on the operation unit 102.

Figure 6:
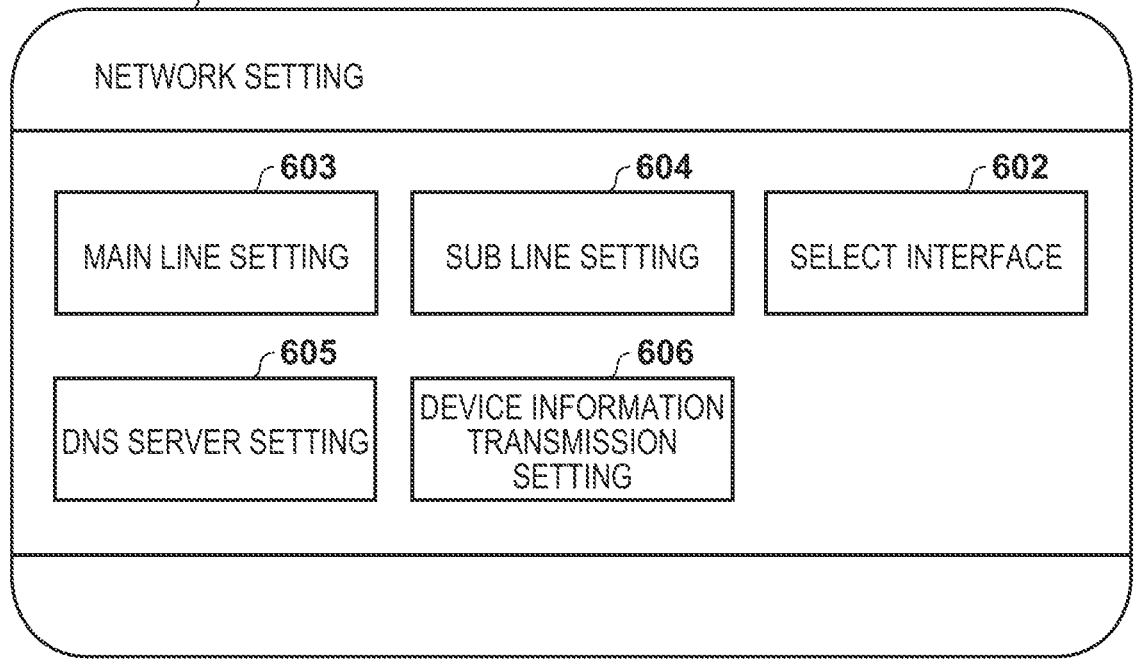
FIG. 6 illustrates a screen configuration of network setting according to the embodiment.

FIG. 6 illustrates the network setting screen 601, which is a middle-layer screen for the user to perform various network settings. In the network setting screen 601, buttons 602 to 606 are displayed such that buttons 602 to 606 can be selected. By pressing the button 602, an interface selection setting screen 701 illustrated in FIG. 7 can be displayed on the operation unit 102. By pressing the button 603, a main line setting screen 801 illustrated in FIG. 8 can be displayed on the operation unit 102. By pressing the button 604, a sub line setting screen 901 illustrated in FIG. 9 can be displayed on the operation unit 102. By pressing the button 605, a DNS server setting screen 1001 illustrated in FIG. 10 can be displayed on the operation unit 102. By pressing the button 606, the information transmission setting screen 1101 can be displayed on the operation unit 102.

Figure 7:
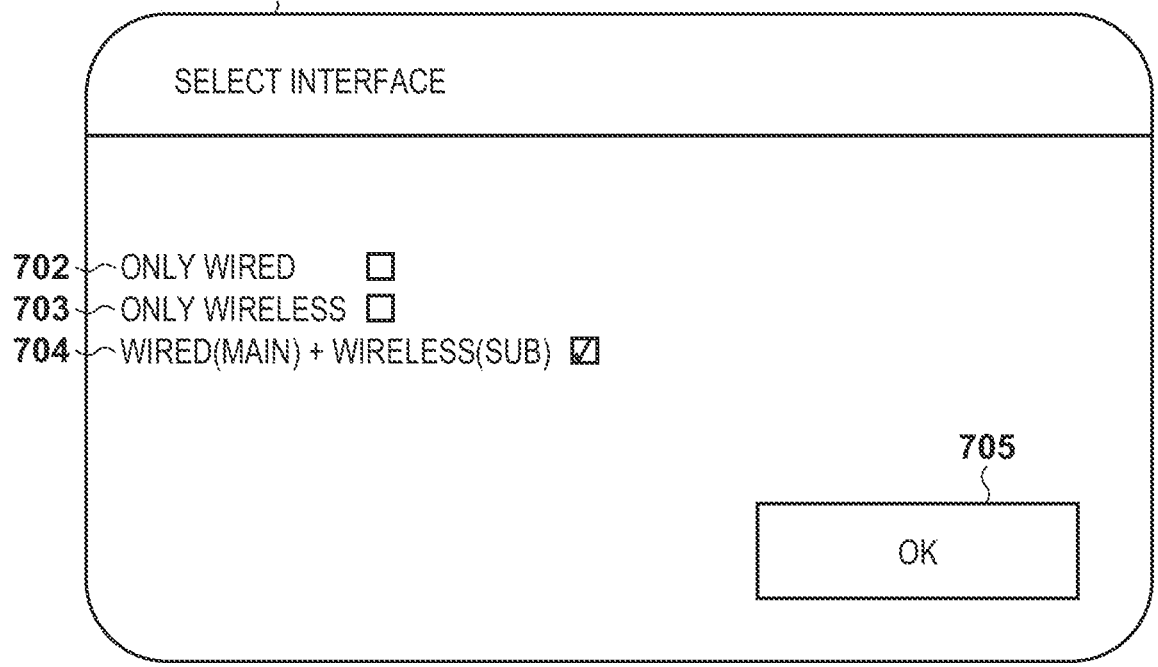
FIG. 7 illustrates a screen configuration for interface selection setting according to the embodiment.

FIG. 7 illustrates the interface selection setting screen 701 for the user to select activation states of the wired LAN and the wireless LAN. When only wired 702 is selected, only the wired LAN operates and the wireless LAN does not operate. In the interface selection setting screen 701, selecting parts 702 to 704 for selecting the communication method are displayed such that the selecting parts 702 to 704 can be selected. When the only wired 702 is selected, only the wired LAN operates and the wireless LAN does not operate. When the only wireless 703 is selected, only the wireless LAN operates and the wired LAN does not operate. In addition, when the wired (main)+wireless (sub) 704 is selected, both the wired LAN and the wireless LAN simultaneously operate. While an exemplary case that the wired LAN is set to the main line and the wireless LAN is set to the sub line at the selection part 704 is given, the present invention is not limited to this example, and other combinations may be applied. The selection parts 702, 703 and 704 are exclusive settings, and therefore only one of them can be selected. By pressing a button 705, the setting selected by the user is stored in the data storage unit 302, and then the display is transferred to the network setting screen 601.

FIG. 8 illustrates the main line setting screen 801 for the user to provide an instruction for a setting related to the IP address (communication parameter) for the main line. In the main line setting screen 801, input parts 802 to 805 are displayed such that the user can select the input parts 802 to 805. The user can input an arbitrary IP address at the IP address input part 802. The user can input an arbitrary subnet mask at the subnet mask input part 803. The user can input an arbitrary default gateway at the default gateway input part 804. The user can select ON/OFF of the DHCP at the DHCP input part 805. By pressing a button 806, the item selected at the main line setting screen 801 can be stored in the data storage unit 302.

FIG. 9 illustrates the sub line setting screen 901 for the user to provide an instruction for a setting related to the IP address (communication parameter) for the sub line. In the sub line setting screen 901, input parts 902 to 904 are displayed such that the user can select the input parts 902 to 904. The user can input an arbitrary IP address at the IP address input part 902. The user can input an arbitrary subnet mask at the subnet mask input part 903. The user can select ON/OFF of the DHCP at the DHCP input part 904. By pressing a button 905, the item selected at the sub line setting screen 901 can be stored in the data storage unit 302. The setting items of the default gateway provided in the main line setting screen 801 is not provided since the functions are disabled in the sub line. In this manner, in the present embodiment, the functions of the sub line are limited in the case that a plurality of lines are simultaneously enabled. It is also possible to disable functions on the sub line side, such as the DNS, the 802.1x, the IP sec, the IP filter, the port filter, the MAC address filter, the SMB, the HTTP, the WebDAV, the FTP and the like. Note that the present invention is applicable to the case that the functions of the sub line are not limited.

FIG. 10 illustrates the DNS server setting screen 1001 for the user to provide an instruction for the IP addresses of the preferred DNS server and the alternative DNS server regardless of whether the main line or the sub line. In the DNS server setting screen 1001, input parts 1002 and 1003 are displayed such that the user input is allowed at the input parts 1002 and 1003. The user can input an arbitrary DNS server IP address at the preferred DNS server input part 1002 and the alternative DNS server input part 1003. By pressing the button 1004, the item input at the DNS server setting screen 1001 is stored in the data storage unit 302, and the display is transferred to the network setting screen 601.

FIG. 11 illustrates the information transmission setting screen 1101 for the user to set the communication parameter of each line for a time when the information transmission unit 307 transmits device information. In the information transmission setting screen 1101, input parts 1102 to 1105 are displayed such that the user input is allowed at the input parts 1102 to 1105. In the interface selection input part 1102, the user can select the main line or the sub line for the information transmission process in which the device information is transmitted. The user can input an arbitrary FQDN (domain name) or IP address at the input part 1103 for the transmission destination of the main line. The user can input an arbitrary IP address at the input part 1104 for the default gateway of the sub line. The user cannot input FQDN, but can input an arbitrary IP address at the input part 1105 for the transmission destination of the sub line. By pressing a button 1106, the setting input by the user is stored in the data storage unit 302, and then the display is transferred to the network setting screen 601. Note that the information transmission setting screen 1101 may be provided as a service mode that can be set by a service person. The service mode can be transferred by a special method unknown to the user.

Determination of Gateway

Next, with reference to FIG. 12, a procedure of a process of determining a default gateway when the MFP 100 according to the present embodiment transmits a packet to a given information device connected via the LAN 150 or the LAN 160 (information transmission process) is described. The processes described below are realized by the CPU 201 reading a program stored in the HDD 205 into the DRAM 202 and executing the program, for example. Here, an exemplary case where the MFP 100 performs an information transmission process at the time when error occurs and/or at a periodic time for transmitting device information is described. The information transmission unit 307 detects a transmission time for device information and/or occurrence of an error, and starts an information transmission process.

At S1201, the information transmission unit 307 acquires the information set at the interface selection input part 1102 of the information transmission setting screen 1101 by referring to the data storage unit 302, and determines whether the line used for performing the information transmission process is the main line or the sub line. When the main line is used, the process proceeds to S1202, and the information transmission unit 307 acquires the information set at the DHCP input part 805 of the main line setting screen 801 by referring to the data storage unit 302, and determines whether ON or OFF. In the case of ON, the process proceeds to S1203, and the information transmission unit 307 performs an information transmission by using a default gateway already acquired by DHCP, and terminates the processing. Prior to the start of this process flow, the process of acquiring the IP address, the subnet mask, and the default gateway in the case that the DHCP is in an on state has been completed.

In the case of OFF at S1202, the process proceeds to S1204, and the information transmission unit 307 determines to use the information set at the default gateway input part 804 of the main line setting screen 801 by referring to the data storage unit 302, and terminates the processing. In the case of the sub line at S1201, the information transmission unit 307 acquires, at S1205, the information set at the DHCP input part 904 of the sub line setting screen 901 by referring to the data storage unit 302, and determines whether ON or OFF. In the case of ON, the information transmission unit 307 determines, at S1206, to use the default gateway already acquired at the DHCP, and terminates the processing. In the case of OFF at S1205, the process proceeds to S1207, and the information transmission unit 307 determines to use the information set at the default gateway of the sub line 1104 of the information transmission setting screen 1101 by referring to the data storage unit 302, and terminates the processing.

Figure 13:
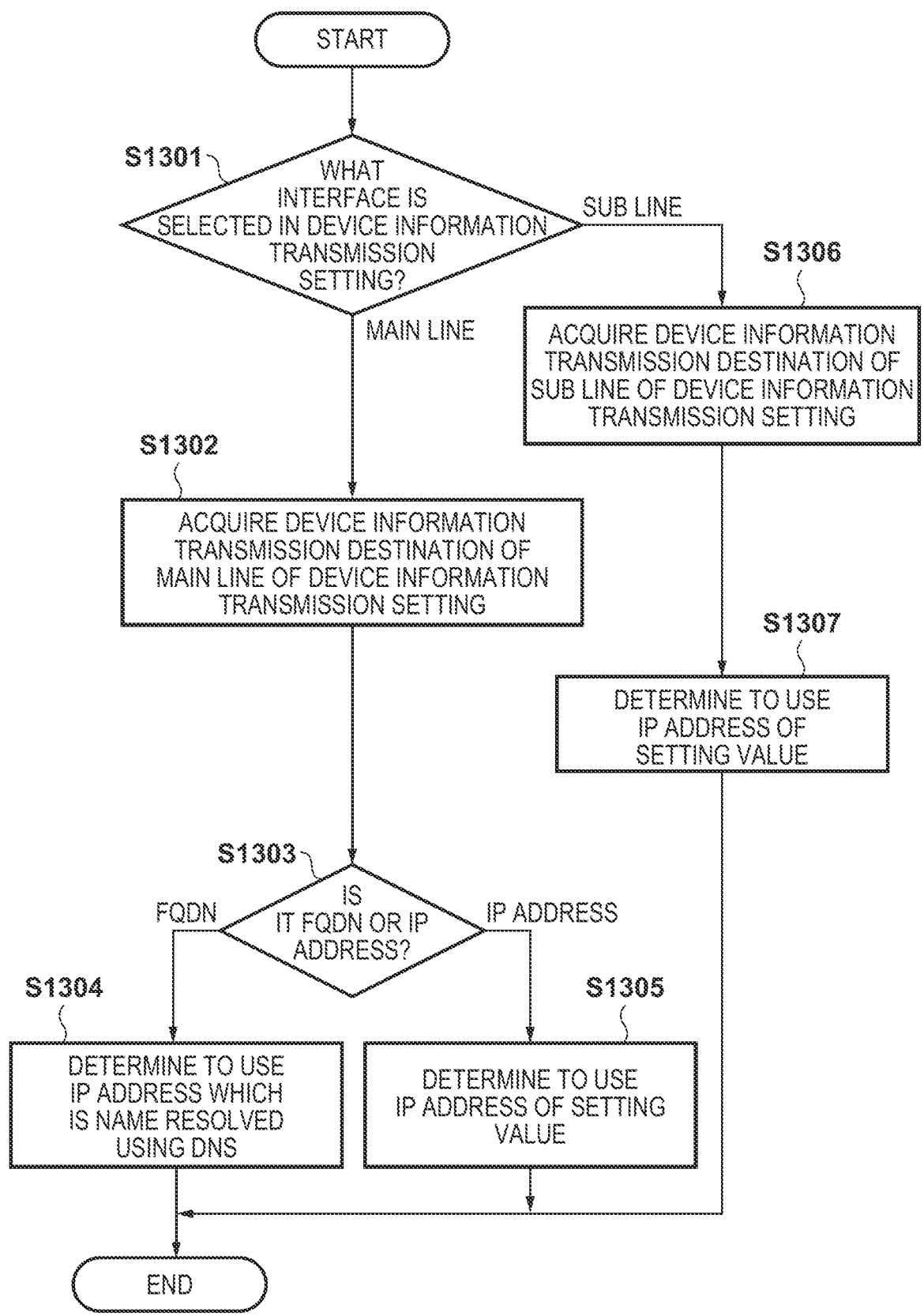
FIG. 13 is a flowchart of a procedure of a process of determining a transmission destination of device information according to the embodiment.

Note that, at S1206, the information transmission unit 307 may give a higher priority to the default gateway of the sub line 1104 of the information transmission setting screen 1101 than the default gateway already acquired at the DHCP. In addition, at S1206 and S1207, both the default gateway already acquired at the DHCP and the default gateway set at the input part for the default gateway of the sub line 1104 of the information transmission setting screen 1101 may be sequentially used. In addition, the information transmission unit 307 determines the gateway used for transmission of device information in a flowchart illustrated in FIG. 12, determines the transmission destination of the device information in a flowchart illustrated in FIG. 13, and thereafter, actually transmits the information by using the determined information. Note that although the transmission process is not illustrated in the drawing, the process is executed after the processes of the flowcharts of FIG. 12 and FIG. 13 are completed. The order in which the processes of the flowcharts of FIG. 12 and FIG. 13 are performed is not limited.

Determination of Transmission Destination

Next, with reference to FIG. 13, a procedure of a process of determining the transmission destination of the device information when the MFP 100 according to the present embodiment transmits a packet to a given information device connected via the LAN 150 or the LAN 160 (information transmission process) is described. The processes described below are performed when the CPU 201 reads a program stored in the HDD 205 to the DRAM 202, for example. Here, FIG. 13 illustrates an exemplary case where the MFP 100 performs an information transmission process at the time when error occurs and/or at a periodic time for transmitting device information is described. The information transmission unit 307 detects a transmission time for device information and/or occurrence of an error, and starts an information transmission process.

At S1301, the information transmission unit 307 acquires the information set at the interface selection input part 1102 of the information transmission setting screen 1101 by referring to the data storage unit 302, and determines whether the line used for performing the information transmission process is the main line or the sub line. When the main line is used, the process proceeds to S1302, and the information transmission unit 307 acquires the information set at the input part 1103 of the device information transmission destination of the main line of the information transmission setting screen 1101 by referring to the data storage unit 302. Subsequently, at S1303, the information transmission unit 307 determines whether the information set at the input part 1103 of the device information transmission destination of the main line is the FQDN or the IP address.

In the case of the FQDN, the process proceeds to S1304, and the information transmission unit 307 performs a process of the DNS, and determines to use, as the transmission destination of the device information, the resolved IP address, and, terminates the processing. Here, in the process of the DNS, a name resolution request is transmitted in accordance with the information of the DNS server set in the DNS server setting screen 1001 illustrated in FIG. 10. Note that the name resolution is performed using an alternative DNS server when it cannot be acquired from the preferred DNS server. In the case of the IP address at S1303, the process proceeds to S1305, and the information transmission unit 307 determines to use, as the transmission destination of the device information, the acquired IP address of the transmission destination input part 1103 of the device information of the main line, and terminates the processing.

When it is determined at S1301 that the sub line is used, the process proceeds to S1306, and the information transmission unit 307 acquires the information set at the input part 1105 of the device information transmission destination of the sub line of the information transmission setting screen 1101 by referring to the data storage unit 302. Subsequently, at S1307, the information transmission unit 307 determines to use, as the transmission destination of the device information, the acquired IP address of the input part 1105 of the device information transmission destination of the sub line, and terminates the processing. Thereafter, the information transmission unit 307 transmits the device information and/or error information in accordance with the determined gateway and transmission destination information.

As described above, the information processing apparatus according to the present embodiment includes a plurality of communication lines that can be connected to respective networks differing from each other. In addition, in this information processing apparatus, a communication line used for a given function and a communication parameter of each communication line used for the given function are set in accordance with a user input, and, in accordance with information thus set, the given function is executed using the communication line. According to the present embodiment, in an apparatus in which a plurality of interfaces can be connected with different networks, a communication parameter of an interface used for a given function can be appropriately set. In addition, in the invention of the subject application, the communication parameter can be individually set for each of the main line and the sub line, and furthermore, an interface related to a given function (transmission of device information) can be set. Thus, device information can be transmitted even when the name resolution has failed in one network.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-080819 filed on Apr. 19, 2018, which is hereby incorporated by reference herein in its entirety.

What is claimed is:

1. A printing apparatus having a device management function for transmitting device information to an external server, comprising:
    a first network interface that performs an Internet Protocol (IP) communication;
    a second network interface that performs an IP communication, wherein a data communication using the second network interface is restricted as compared with a data communication using the first network interface in the printing apparatus;
    at least one memory that stores a set of instructions; and
    at least one processor that executes the instructions, the instructions, when executed, causing the printing apparatus to perform operations comprising:
    set, as a first setting related to the device management function, a network interface to be used for a transmission of the device information;
    set, as a second setting related to the device management function, address information used for transmitting the device information via the second network interface; and
    transmit the device information to the external server by using the set network interface,
    wherein the transmission of the device information to the external server is performed using the address information set as the second setting in a case where a network interface to be used for transmitting the device information is set to be the second network interface as the first setting, and
    wherein the transmission of the device information to the external server is performed without using the address information set as the second setting in a case where a network interface to be used for transmitting the device information is set to be the first network interface as the first setting.

2. The printing apparatus according to claim 1, wherein:
    a set communication parameter corresponding to the first network interface and a set communication parameter corresponding to the second network interface are different from each other.

3. The printing apparatus according to claim 2, wherein the address information set as the second setting is address information of an IP address format.

4. The printing apparatus according to claim 2, wherein
    the communication parameter corresponding to the first network interface at least includes an IP address, a subnet mask, a default gateway, and information of a DHCP server; and
    the communication parameter corresponding to the second network interface includes an IP address, a subnet mask, and information of a DHCP server but does not include a default gateway.

5. The printing apparatus according to claim 1, wherein the device information of the printing apparatus transmitted to the external server includes at least an error status occurring in the printing apparatus.

6. The printing apparatus according to claim 1, wherein the device information of the printing apparatus transmitted to the external server includes at least information of a counter of the printing apparatus.

7. The printing apparatus according to claim 1, wherein the operations further comprise:
    display a setting screen capable of accepting a user operation for changing the first setting and the second setting in accordance with an acceptance of a predetermined user operation.

8. A method of controlling a printing apparatus having a device management function for transmitting device information to an external server, the printing apparatus comprising a first network interface that performs an Internet Protocol (IP) communication and a second network interface that performs an IP communication, wherein a data communication using the second network interface is restricted as compared with a data communication using the first network interface in the printing apparatus, the method comprising:
    setting, as a first setting related to the device management function, a network interface to be used for a transmission of the device information;
    setting, as a second setting related to the device management function, address information used for transmitting the device information via the second network interface; and
    transmitting the device information to the external server by using the set network interface,
    wherein the transmission of the device information to the external server is performed using the address information set as the second setting in a case where a network interface to be used for transmitting the device information is set to be the second network interface as the first setting, and
    wherein the transmission of the device information to the external server is performed without using the address information set as the second setting in a case where a network interface to be used for transmitting the device information is set to be the first network interface as the first setting.

9. A non-transitory computer-readable storage medium storing a computer program for causing a computer to execute a method of controlling a printing apparatus having a device management function for transmitting device information to an external server, the printing apparatus comprising a first network interface that performs an Internet Protocol (IP) communication and a second network interface that performs an IP communication, wherein a data communication using the second network interface is restricted as compared with a data communication using the first network interface in the printing apparatus, the method comprising:
- setting, as a first setting related to the device management function, a network interface to be used for a transmission of the device information;
- setting, as a second setting related to the device management function, address information used for transmitting the device information via the second network interface; and
- transmitting the device information to the external server by using the set network interface,
- wherein the transmission of the device information to the external server is performed using the address information set as the second setting in a case where a network interface to be used for transmitting the device information is set to be the second network interface as the first setting, and
- wherein the transmission of the device information to the external server is performed without using the address information set as the second setting in a case where a network interface to be used for transmitting the device information is set to be the first network interface as the first setting.

* * * * *